United States Patent [19]

Hollinger et al.

[11] Patent Number: 4,988,070

[45] Date of Patent: Jan. 29, 1991

[54] EXHAUST PIPE HANGER

[75] Inventors: Raymond D. Hollinger, Richmond; James M. Dawson, Ortonville; Edward A. Vaughan, Rochester, all of Mich.

[73] Assignee: General Motors Corporation, Detroit, Mich.

[21] Appl. No.: 399,793

[22] Filed: Aug. 28, 1989

[51] Int. Cl.⁵ ............................................. F16M 13/00
[52] U.S. Cl. ...................................... 248/613; 248/60; 294/82.14
[58] Field of Search ...................... 248/613, 60, 59, 58, 248/74.3; 24/115 A, 265 A, 265 H; 294/82.14; 16/2

[56] References Cited

U.S. PATENT DOCUMENTS

| | | | |
|---|---|---|---|
| 442,232 | 12/1890 | Mansfield | 248/613 X |
| 1,699,114 | 1/1929 | Meagher | 294/157 X |
| 2,160,808 | 6/1939 | Bradley | 280/106 |
| 2,225,472 | 12/1940 | Franklin | 16/2 |
| 2,227,306 | 12/1940 | Guy | 248/54 |
| 2,267,431 | 12/1941 | Steensen | 248/60 |
| 2,288,172 | 6/1942 | Ulrich | 248/54 |
| 2,290,621 | 7/1942 | Riesing | 248/54 |
| 2,744,706 | 5/1956 | Gerdy | 248/60 |
| 2,842,218 | 7/1958 | Bradbury | 180/64 |
| 2,912,198 | 11/1959 | Feil, Jr. | 248/60 |
| 3,464,093 | 9/1969 | Laharty | 294/82.14 X |
| 3,605,203 | 9/1971 | Wallace | 294/82.14 X |
| 3,843,080 | 10/1974 | Imai et al | 248/58 |
| 4,074,945 | 2/1978 | Kraus et al. | 16/2 X |
| 4,290,572 | 9/1981 | Pate | 248/74B |
| 4,309,019 | 1/1982 | Bloom | 248/610 |
| 4,324,503 | 4/1982 | Sevrence | 16/2 X |
| 4,361,304 | 11/1982 | Younger | 248/544 |
| 4,380,324 | 4/1983 | Woesler | 248/610 |
| 4,413,657 | 11/1983 | Sasaki et al. | 138/149 |
| 4,415,188 | 11/1983 | Ginter, Jr. | 285/420 |
| 4,415,391 | 11/1983 | Reid | 156/187 |
| 4,490,886 | 1/1985 | Omata | 2416PB |
| 4,494,722 | 1/1985 | Kanai et al. | 248/621 |
| 4,546,950 | 10/1985 | Cech | 248/60 X |
| 4,572,466 | 2/1986 | Yamaguchi et al | 248/73 |
| 4,638,965 | 1/1987 | DeBruine et al. | 248/59 |

FOREIGN PATENT DOCUMENTS 2616978 10/1977 Fed. Rep. of Germany ........ 248/59

Primary Examiner—Carl D. Friedman
Assistant Examiner—Daniel Hulseberg
Attorney, Agent, or Firm—Karl F. Barr, Jr.

[57] ABSTRACT

A hanger apparatus for supporting a tubular member relative to a body, having a flexible elongate member with a resilient member fastened to a first end for attachment of the elongate member to the body, and clip means fastened to a second end for attachment to an intermediate portion of the elongate member, thereby forming a loop between the second end and the intermediate portion of said elongate member within which the tubular member may be supported.

3 Claims, 1 Drawing Sheet

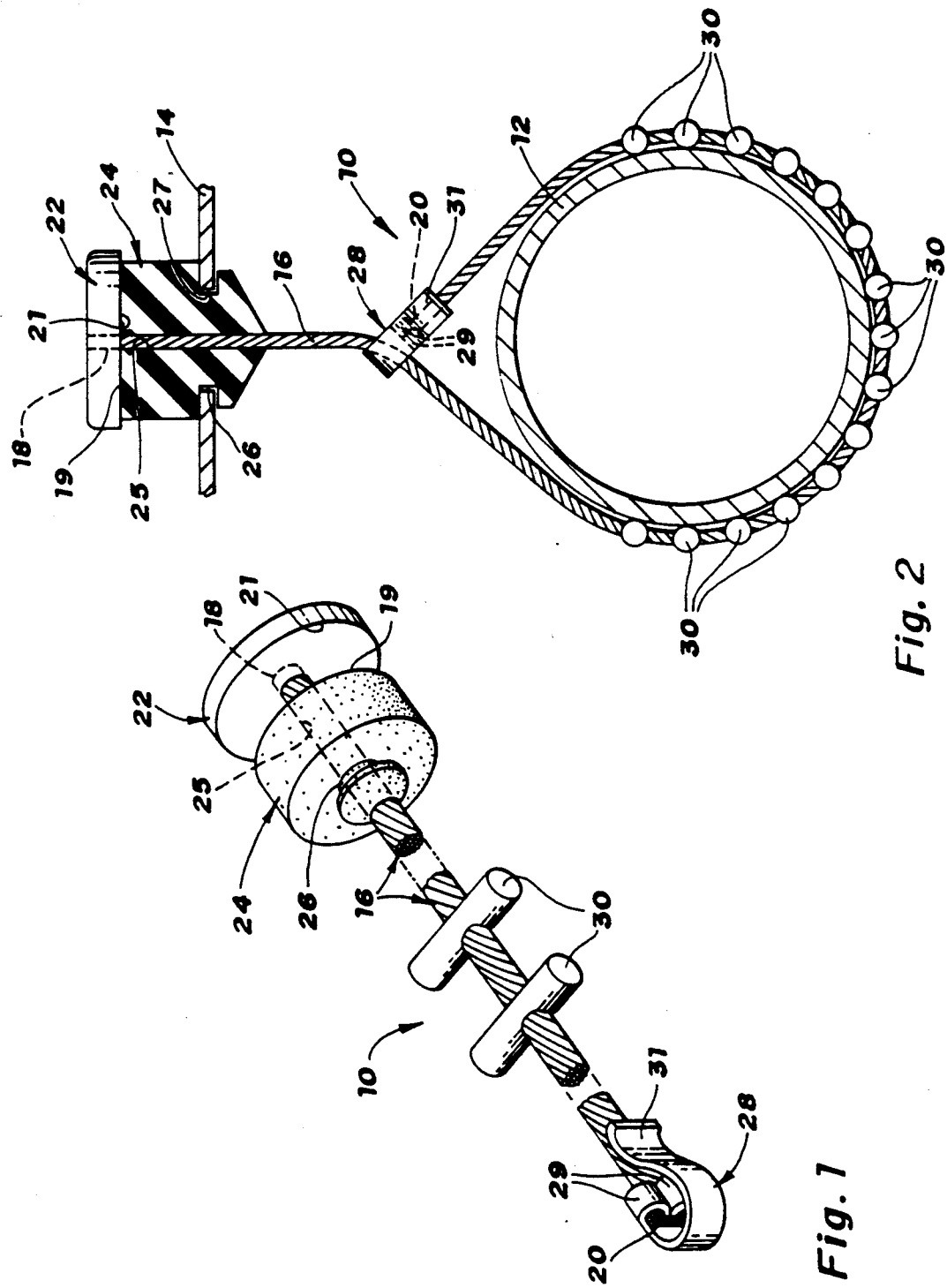

EXHAUST PIPE HANGER

BACKGROUND OF THE INVENTION

1. Field of the Invention

The present invention relates to a hanger apparatus for supporting a tubular member relative to a body and, more particularly, to a simplified hanger for use in supporting an exhaust pipe relative to the body of an automotive vehicle.

2. Description of the Prior Art

Typical automotive vehicle exhaust systems are suspended beneath the vehicle by means of exhaust pipe hangers which generally comprise a combination of sub-assemblies including a resilient portion, for absorbing vibration and noise, and rigid clamping members for fastening the resilient member to the vehicle body and the exhaust pipe.

Common shortcomings recognized in prior art hangers are the need for frame brackets which must be attached to the undercarriage of the vehicle with suitable fasteners and a similar need for exhaust pipe brackets which are either welded to the exhaust system or are clamped around the pipe. This additional hardware must be individually attached to the vehicle with a resultant increase in time and, ultimately, cost per unit.

The present invention is directed to the above shortcomings.

SUMMARY OF THE INVENTION

In accordance with the present invention, a hanger for a tubular member is disclosed. The hanger comprises a flexible elongate member, to one end of which is fastened a resilient attaching member which is configured to engage the underside of the body of an automotive vehicle. The resilient properties of the attaching member are valuable in reducing the transmission of vibration and noise to the vehicle body during operation. A rigid interlock may be fixed to the elongate member on the upper side of the resilient attaching member. The interlock assures support of the tubular member should the resilient member fail during operation. A fastener is attached to the opposite end of the elongate member. The fastener has an end portion which is configured to engage an intermediate portion of the elongate member, when passed around the tubular member, to form a loop within which the tubular member is supported.

To minimize contact between the hanger and tubular member around which it is wrapped, spacers are placed along an intermediate portion of the elongate member. The spacers extend outwardly from the member in the area of tube contact and act in a supporting relationship to reduce contact between the elongate member and the tubular member. Minimization of line contact in this manner is desirable to reduce moisture retention between the surfaces with a resulting reduction in corrosion at the point of support.

The one piece final assembly of the present invention substantially reduces the installation complexity. Additionally, the configuration of the resilient attaching member may be installed in an aperture or slot in the body and eliminates the need for a screw-type fastener or welded bracket. Similarly, the looped configuration of the supporting portion of the exhaust pipe hanger dispenses with the requirement of welding or otherwise attaching a bracket to the tubular member, thereby eliminating weld burn-off of protective anti-corrosion coatings or other anti-corrosion properties inherent in the material of the tubular member. Also, corrosion resistance is further enhanced through the use of the spacing members disposed along the contact portion of the hanger which are designed to promote flushing of the contact area thereby minimizing corrosion.

Other objects and features of the invention will become apparent by reference to the following description and to the drawing.

BRIEF DESCRIPTION OF THE DRAWING

FIG. 1 is a perspective view of a hanger embodying the present invention;

FIG. 2 is an end view, partially in section, of the hanger of FIG. 1 being used to support a tubular member relative to a body.

DESCRIPTION OF THE PREFERRED EMBODIMENT

In FIGS. 1 and 2 there is shown a hanger, designated generally as 10, useful for supporting a tubular member 12 with respect to a body such as the undercarriage of an automotive vehicle body 14. Hanger 10 comprises a flexible, elongate cable 16 having first and second ends 18 and 20, respectively. Fastened to first end 18 of cable 16 is rigid interlock 22. The interlock may be die cast, from any suitable material, directly on to end 18 of cable 16 so as to be permanently attached thereto.

Mounted on elongate cable 16, in an adjacent, axially inward location relative to interlock 22, is attaching means 24 which is configured to engage the vehicle body 14, thereby supporting hanger 10. As best illustrated in FIG. 2, attaching means 24 comprises a cylindrical member having an axially extending central passage 25 through which elongate member 16 passes. An annular groove 26 extends about the outside circumference of attaching means 24 and is engaged by the edge portions of aperture 27 formed in body 14 in a supportive relationship thereto. Inner face 21 of interlock 22 rests in face-to-face engagement with top surface 19 of attaching means 24 to prevent passage of elongate member 16 therethrough. Should the resilient material of attaching means 24 fail due to age or environmental factors, interlock 22 will prevent hanger failure by engaging the top surface of body 14 to support hanger 10 relative thereto. As a result, potentially destructive damage caused by the exhaust system striking the ground during vehicle movement can be avoided.

Fastened to second end 20 of flexible cable 16 is clip 28. The clip 28 is formed with crimp wings 29 which are crimped to cable end 20. A hook-shaped end portion 31 is configured to detachably engage cable 16, as shown in FIG. 2, at a position intermediate its first and second ends 18 and 20. The cable 16 is passed around tubular member 12 and the hook-shaped end portion of clip 28 is engaged with cable 16. In this manner, tube 12 is supported about a substantial portion of its outer circumference within the loop formed by hanger 10.

To minimize contact between cable 16 and tubular member 12, spacers 30 are fastened to cable 16. The spacers 30 are placed at intervals along an intermediate portion of cable 16 in spaced relationship to one another. The spacers 30 extend outwardly from cable 16 so as to contact the tubular member 12 when hanger 10 is used in a supporting relationship therewith. As a result, line contact of cable 16 with tubular member 12 is reduced thereby lessening the likelihood of crevice corrosion between the tubular member and hanger 10. The spacer means comprise metal cylinders which are die cast to the intermediate portion of cable 16.

As a result of the features of the present invention, an exhaust system hanger is provided which comprises a one piece final assembly for reduced installation complexity. The supporting arrangement is configured to be installed in an aperture or slot in the supporting body thereby eliminating the need for screw-type fasteners or welded brackets Also, the looped configuration of the supporting portion of the exhaust pipe hanger dispenses with the requirement of welding or otherwise attaching brackets to the tubular member. As a result, weld burn-off of anti-corrosion coatings or other anti-corrosive properties inherent in the material of the tubular member is prevented.

Furthermore, resistance to corrosion is further enhanced through the use of spacing members disposed along the contact portion of the hanger. These spacing members prevent line contact between the hanger and the tubular member by promoting flushing of the contact area.

While certain embodiments of the invention have been described in detail above in relation to a hanger for supporting a tubular member, it would be apparent to those skilled in the art that the disclosed embodiment may be modified. Therefore, the foregoing description is to be considered exemplary, rather than limiting, and the true scope of the invention is that described in the following claims.

The embodiments of the invention in which an exclusive property or privilege is claimed are defined as follows:

1. An exhaust system for support from an opening in the undercarriage of an automotive vehicle comprising:
   a tubular exhaust conduit;
   a flexible, elongate cable member;
   a flat, rigid retaining member fixedly attached to a first end of said cable member, normal to the axis thereof and having a dimension larger than said opening;
   a resilient isolation member disposed about said cable member adjacent to said retaining member configured to engage said opening in an interference fit;
   clip means fastened to a second end of said cable member and configured to detachably engage said cable member at a position intermediate of said first and second ends to form a loop about said exhaust conduit for support therein.

2. An exhaust system for support from an opening in the undercarriage of an automotive vehicle body, as defined in claim 1, further comprising:
   a plurality of rigid cylindrical spacers fixed in spaced relationship to the intermediate portion of said cable member;
   said spacers extending outwardly from said cable member to contact said exhaust conduit, in a supporting relationship, thereby minimizing contact between said cable member and said exhaust conduit.

3. An exhaust system for support from an opening in the undercarriage of an automotive vehicle body, as defined in claim 1, said isolation member having an annular groove extending about the circumference thereof to engage the inner circumference of said opening in said vehicle body.

* * * * *